(12) United States Patent
Berndt

(10) Patent No.: US 11,788,647 B2
(45) Date of Patent: Oct. 17, 2023

(54) VALVE ARRANGEMENT HAVING VALVE MODULE AND BASE MODULE

(71) Applicant: Agilent Technologies, Inc., Santa Clara, CA (US)

(72) Inventor: Manfred Berndt, Karlsruhe (DE)

(73) Assignee: Agilent Technologies, Inc., Santa Clara, CA (US)

( * ) Notice: Subject to any disclaimer, the term of this patent is extended or adjusted under 35 U.S.C. 154(b) by 256 days.

(21) Appl. No.: 17/259,123

(22) PCT Filed: Jul. 11, 2019

(86) PCT No.: PCT/IB2019/055920
§ 371 (c)(1),
(2) Date: Jan. 8, 2021

(87) PCT Pub. No.: WO2020/012404
PCT Pub. Date: Jan. 16, 2020

(65) Prior Publication Data
US 2021/0156493 A1    May 27, 2021

(30) Foreign Application Priority Data
Jul. 11, 2018    (DE) .................... 10 2018 116 830.6

(51) Int. Cl.
*F16K 99/00*    (2006.01)
*G01N 30/20*    (2006.01)
(Continued)

(52) U.S. Cl.
CPC ...... *F16K 99/0042* (2013.01); *F16K 99/0013* (2013.01); *G01N 30/20* (2013.01);
(Continued)

(58) Field of Classification Search
CPC ............... F16K 11/0743; F16K 31/043; F16K 99/0042; F16K 99/0013; G01N 2030/202; G01N 30/20
See application file for complete search history.

(56) References Cited

U.S. PATENT DOCUMENTS 3,297,053 A    1/1967    Mckinney
3,752,167 A *  8/1973    Makabe .............. F16K 11/0743
                                                      137/625.46
(Continued)

FOREIGN PATENT DOCUMENTS

CN    102913645 A    2/2013
CN    103314289 A    9/2013
(Continued)

OTHER PUBLICATIONS

Notification of Transmittal of The International Search Report and Written Opinion dated Oct. 30, 2019; Application No. PCT/IB2019/055920; 15 pages.
(Continued)

*Primary Examiner* — Craig M Schneider
*Assistant Examiner* — Christopher D Ballman

(57) ABSTRACT

A valve arrangement includes a valve module and a base module. The valve module includes a stator and a rotor, which is rotatable relative to the stator such that at least one fluid connection is formable between the stator and the rotor. The base module includes at least a part of a force control mechanism for selectively implementing a force-releasing or force-coupling of the rotor and the stator, whereby the valve module and the base module are selectively coupleable to or decoupleable from each other.

20 Claims, 4 Drawing Sheets

(51) Int. Cl.
*F16K 11/074* (2006.01)
*F16K 31/04* (2006.01)

(52) U.S. Cl.
CPC ......... *F16K 11/0743* (2013.01); *F16K 31/043* (2013.01); *F16K 2099/0084* (2013.01); *G01N 2030/202* (2013.01)

(56) References Cited

U.S. PATENT DOCUMENTS

| | | | |
|---|---|---|---|
| 3,990,476 A | | 11/1976 | Young et al. |
| 4,444,066 A | * | 4/1984 | Ogle ...................... G01N 30/20 |
| | | | 73/864.21 |
| 5,920,006 A | * | 7/1999 | Zelechonok .......... F04B 7/0007 |
| | | | 73/61.55 |
| 6,193,213 B1 | * | 2/2001 | Stearns ................... F16K 3/188 |
| | | | 137/625.46 |
| 7,201,185 B2 | * | 4/2007 | Poppe ..................... F16K 31/04 |
| | | | 137/554 |
| 8,322,374 B2 | * | 12/2012 | Tomita ................ F16K 11/0743 |
| | | | 137/625.46 |
| 8,627,851 B2 | | 1/2014 | Tower et al. |
| 9,063,114 B2 | | 6/2015 | Wiechers et al. |
| 9,238,281 B2 | | 1/2016 | Tower et al. |
| 9,303,775 B2 | | 4/2016 | Jencks et al. |
| 9,388,908 B2 | | 7/2016 | Tower |
| 9,597,932 B2 | * | 3/2017 | Dieckmann ....... B60C 23/00372 |
| 10,364,900 B2 | * | 7/2019 | Hara ................... F16K 11/0743 |
| 2005/0199304 A1 | | 9/2005 | Poppe et al. |
| 2007/0028971 A1 | | 2/2007 | Wagner |
| 2010/0276617 A1 | * | 11/2010 | Yasunaga ............ F16K 11/0743 |
| | | | 251/129.11 |
| 2011/0024657 A1 | | 2/2011 | Tower |
| 2011/0303304 A1 | | 12/2011 | Tower et al. |
| 2014/0042349 A1 | | 2/2014 | Wiechers et al. |
| 2014/0053910 A1 | | 2/2014 | Bunner et al. |
| 2015/0122655 A1 | | 5/2015 | Choikhet et al. |
| 2016/0201827 A1 | | 7/2016 | Tower |
| 2016/0273664 A1 | * | 9/2016 | Olovsson ............... G01N 30/00 |
| 2018/0080908 A1 | | 3/2018 | Picha |

FOREIGN PATENT DOCUMENTS

| | | |
|---|---|---|
| CN | 103438245 A | 12/2013 |
| CN | 103574098 A | 2/2014 |
| CN | 104948770 A | 9/2015 |
| DE | 0309596 A1 | 4/1989 |
| DE | 102008042252 A1 | 4/2009 |
| DE | 102010007137 A1 | 8/2011 |
| DE | 102012107379 A1 | 2/2014 |
| GB | 0424249 | 11/2006 |
| GB | 201518438 | 12/2015 |
| JP | 2008215494 A | 9/2008 |
| WO | 2009003521 A1 | 1/2009 |
| WO | 2011095350 A1 | 8/2011 |
| WO | 2015062830 A1 | 5/2015 |

OTHER PUBLICATIONS

Chinese Office Action and Search Report dated Sep. 20, 2022 for application No. 201980045173.6; 6 pages.

* cited by examiner

US 11,788,647 B2

VALVE ARRANGEMENT HAVING VALVE MODULE AND BASE MODULE

RELATED APPLICATIONS

This application is the national stage under 35 U.S.C. 371 of International Application No. PCT/IB2019/055920, filed Jul. 11, 2019, which claims priority to German Application No. DE 10 2018 116 830.6, filed Jul. 11, 2018, the entire contents of both of which are incorporated by reference herein.

TECHNICAL BACKGROUND

The present invention relates to a valve arrangement, a sample separation apparatus, and a method for handling a valve arrangement.

In a high performance liquid chromatography (HPLC), a liquid (mobile phase) is typically moved through a so-called stationary phase (for example in a chromatographic column) at a very precisely controlled flow rate (for example in the range of microlitres to millilitres per minute) and at a high pressure (typically 20 to 800 bar and beyond, currently up to 2000 bar) at which the compressibility of the liquid may be noticeable, in order to separate from each other individual components of a sample liquid introduced into the mobile phase. Such an HPLC system is known, for example, from EP 0,309,596 B1 of the same applicant, Agilent Technologies, Inc. Such an HPLC system often has a fluid pump with one or more pistons reciprocating in a piston chamber, which interacts or interact with one or more inlet valves. An injector for injecting the fluid sample into the mobile phase may also have a fluidic injector valve In other words, one or more fluidic valves are often provided in sample separation apparatuses.

U.S. Pat. No. 9,845,894 B2 discloses a rotor valve having a stator and a rotor, which is in rotating sliding engagement for rotating with respect to the stator about a valve axis. The stator contains a plurality of fluid ports. The rotor is operable for selectively fluidically connecting two or more of these fluid ports during the rotary sliding engagement. The valve further has an actuator, which may disengage the rotor and stator in order to allow an efficient cleaning of valve connections.

The maintenance and the replacement of components of a fluid valve is often laborious.

SUMMARY

It is an object of the invention to establish a fluid valve, in which an easy maintenance and a simple replacement of components or parts, in particular a rotor, is allowed for.

According to an exemplary embodiment of the present invention, a valve arrangement is established, which has: a valve module with a stator and a rotor, wherein the rotor is rotatable or turnable relative to the stator such that at least one fluid connection (i.e. a switchable fluidic path, which selectively permits or does not permit a fluid flow between the rotor and the stator) is formable between the stator and the rotor; a force generation mechanism for force-coupling the rotor and the stator to each other, a force control mechanism for controlling the force generation mechanism in order to effect a selective activation or deactivation of the force-coupling between the rotor and the stator; and a base module, which has at least a part of a force control mechanism (i.e. the whole force control mechanism or only a part of the force control mechanism) for selectively force-releasing or force-coupling the rotor and the stator. The valve module and the base module are thus selectively coupleable or decoupleable from each other by the selective activation or deactivation of the force-coupling between the rotor and the stator.

According to another exemplary embodiment, a sample separation apparatus for separating a fluidic sample is provided, wherein the sample separation apparatus has: a fluid drive for driving a mobile phase and the fluidic sample present therein; a sample separation device for separating the fluidic sample present in the mobile phase; and a valve arrangement (through which, for example, the mobile phase and/or the fluidic sample are guidable) having the features described above.

According to yet another exemplary embodiment, a method for handling a valve arrangement having the above-described features is provided, wherein the method has: an operating the valve arrangement in an operating state (which may for example be referred to as a fluid control state), in which the valve module and the base module (in particular for permitting or not permitting a fluid flow) are coupled to each other, and the rotor and the stator are force-coupled to each other, and (for example in another operating state, which may for example be described as a maintenance state) a subsequent force-releasing of the rotor relative to the stator by (for example user-side actuation or processor-side control) the force control mechanism.

In the context of the present application, the term "force control mechanism" is understood to refer to, in particular, a mechanism which allows a defined adjustment of whether a rotor and a stator of the valve arrangement are force-coupled to each other (i.e. exert a force on each other) or are force-released (or force-decoupled) from each other (i.e. are in an operating state in which they do not exert any force on each other and are therefore force-decoupled from each other). The force control mechanism may be implemented at and/or in the base module. On the other hand, a force generation mechanism (for example a spring component), which may generate a coupling force between the rotor and the stator, may be arranged, for example, in the valve module or in the base module, or partly in the valve module and for another part in the base module. In particular, the force control mechanism may be configured to control the force generation mechanism such that the latter exerts a coupling force on the rotor and/or the stator for force-coupling, or refrains from exerting a coupling force on the rotor and/or the stator for force-releasing.

According to an exemplary embodiment of the invention, a valve arrangement is provided, which is constructed from in particular two separately manageable components, namely a valve module and a base module. The valve module contains the components that come into contact with a fluid to be handled, i.e. a stator and a rotor having corresponding fluidic structures. Between the stator and rotor, a fluidic coupling between fluid-carrying openings of the stator and fluid-carrying openings of the rotor can be formed, or such a fluidic coupling can be deactivated, by an according switching of the valve arrangement. The valve module is configured as a rotary valve module, in which a rotation between the rotor and the stator enables the different fluid coupling states and/or fluid decoupling states. During operation, i.e. when a fluid is to be guided between rotor and stator, mutually facing coupling surfaces of the rotor and the stator are force-coupled to each other. This may mean in particular that the rotor and stator are then pressed so tightly to each other that a substantially fluid-tight handling of the fluid between the rotor and the stator is possible. A force control mechanism controls the force-coupling between the rotor and the stator and, in the force-coupled state, causes the rotor and stator to be coupled together in a fluid-tight manner. The said force control mechanism may be implemented at least partially in the base module, which is configured as a component that is handleable (or manageable) separately from the valve module. The modular provision of the valve module and the base module as separately handleable components provides advantages in connection with the maintenance and a necessary repair and/or a replacement of one or more wearing parts of the valve arrangement after prolonged use. The rotor in particular is a component, which should be replaced or at least serviced after a certain period of operation due to high mechanical stress (or wear) during operation. In order to enable a user to carry out this maintenance or replacement, the previously described force-coupling between the rotor and the stator can be deactivated by the force control mechanism, i.e. a force-releasing of the rotor and the stator can be set. In a force-released state of the rotor and the stator, these two components are then not fluid-tightly force-coupled, in particular they are not pressed firmly onto each other or in contact. After the force-releasing, for example the rotor can be replaced in an easy and intuitive manner without the user having to carry out difficult adjustment measures. The reason for this is that the force control mechanism enables a force-releasing and then allows a replacement of the rotor simply by removing the worn rotor and fitting a replacement rotor. Since the formation (or design) of the force control mechanism requires a certain amount of effort, the corresponding components can be accommodated at least partially and preferably completely in the base module, as opposed to an accommodation of all these components in the valve module. In this way it is possible to provide a functionally powerful base module and to combine and operate it selectively also with several different valve modules, each being designed sparsely complex. The total expenditure in terms of hardware in connection with the configuration of the valve arrangement can be kept low, at a high level of functionality by the described modularity.

In the following, additional embodiments of the valve arrangement as well as the sample separation apparatus and the method are described.

According to an embodiment, the valve arrangement may be configured as a high-pressure valve arrangement. In particular, the valve arrangement may be configured to handle a fluid at a pressure of at least 800 bar, in particular of at least 1200 bar, and further in particular of at least 1800 bar. Such a high pressure valve arrangement may be used with advantage for high-pressure applications, such as for example HPLC, more generally in liquid chromatography. In high-pressure applications, fluids are conveyed at high pressures of hundreds or even thousands of bars, which places particularly high demands on the tightness of a fluid valve in order to prevent leakage. In order to achieve such tightness, a reliable and reproducible force-coupling between stator and rotor is advantageous during operation of the valve arrangement. By controlling, in a valve arrangement according to an exemplary embodiment of the invention, this force-coupling by a force control mechanism, this demanding and error-prone task is detracted from user intervention and can therefore be performed reliably and error-free in a definedly controlled manner.

According to an embodiment, the valve arrangement may have at least one further (or second) valve module having a further (or second) stator and a further (or second) rotor, wherein the further rotor is rotatable or turnable relative to the further stator such that at least one fluid connection is formable between the further stator and the further rotor, and wherein the at least one further valve module is configured to be coupled to the base module instead of the (first) valve module or to be decoupled from the base module. In other words, in the valve arrangement, a single base module can be combined with plural valve arrangements or modules in the form of replaceable (or exchangeable) valve cartridges, of which a specific one is coupled to the base module for a particular application. The greater hardware engineering effort associated with the configuration of the base module, in particular the force control mechanism, is then demonstratively incurred only once, wherein a user can use this platform of the base module for the assembly of completely different valve modules in accordance with a specific application. Overall, this results in a compact and resource-saving configuration.

According to an embodiment, the (first) valve module and the other (or second) valve module may differ in at least one of the group that consists of: a fluid coupling pattern, a supported operating pressure, and an associated application. A fluid coupling pattern can be understood to refer to an arrangement of fluid connections (also called ports) and, if necessary, fluid coupling channels (for example, fluid-carrying grooves) on the stator, as well as an arrangement of one or more fluid coupling channels on the rotor. Such cooperating fluid connections and fluid coupling channels may realize different fluid coupling states and/or fluid decoupling states in the different switching states of the valve module. Furthermore, different valve modules may be configured for different operating pressures. Different applications of the valve arrangement (for example use as an injector valve, a sample buffer valve, a check valve, an inlet valve, etc.) can therefore be accommodated with one base module and different valve modules.

According to an embodiment, the valve module may be configured to exclusively perform a valve function. In other words, the configuration of a valve module may be limited to enabling the valve function by an interaction of rotor and stator. Other functions may be outsourced to the base module. In particular, the force control mechanism may be implemented in the base module, whereas the valve module may be provided with only a force generation mechanism, such as for example a disc spring package (or disc spring assembly). The plural valve modules may therefore all be configured simply and compactly, and may be operatable with one and the same platform in the form of the same base module. Overall, this reduces the hardware-related expenditure in connection with the configuration of the valve arrangement.

According to an embodiment, the valve arrangement may have the force generation mechanism, which is controllable by the force control mechanism, and which is configured to generate a coupling force that serves to force-couple the rotor and the stator. In a first operating state, the force generation mechanism may be controlled by the force control mechanism such that the rotor and stator are force-coupled by the coupling force that is generated by the force generation mechanism. In addition, in a second operating state, the force generation mechanism may be controlled by the force control mechanism such that the rotor and stator are force-released from each other irrespective of a coupling force generated by the force generation mechanism, such that the coupling force then does not act on the rotor and the stator. The latter may be achieved by a selective deactivation (or disabling) of the coupling force, such that the force generation mechanism temporarily generates no force at all (for example, by switching off a current source, when a magnetic coupling force is generated by an electromagnet). Alternatively, for releasing the force between the rotor and the stator, the coupling force may be maintained, but acting on the rotor or the stator can be temporarily made impossible (for example by moving the rotor and/or the stator mechanically so that a spring force of the force generation mechanism no longer acts on the rotor and/or the stator).

Particularly advantageously, the force control mechanism may be arranged in the valve module. In this case, the position of the force transmission between the rotor and the stator is very close to the position of the rotor and/or the stator, whereby a highly undesirable generation of tilting forces between the rotor and the stator may be effectively suppressed. Circumferentially not completely homogeneous contact pressure forces of the rotor against the stator then demonstratively only act along a very short lever path between the force control mechanism and the rotor, both of which are located in the valve module. Thus, by implementing the force generation mechanism in the valve component, a particularly low-wear operation of the valve arrangement may be ensured.

According to an embodiment, the valve arrangement may have a spring component (in particular a disc spring package) (which spring component is in particular arranged in the valve component) for force-coupling the rotor and the stator by a spring force. In other words, the stator and the rotor may be pressed together during operation by a mechanical spring. The spring component is an example of the force generation mechanism mentioned above. In particular, a disc spring package that is formed annularly is very well suited for creating a circumferentially constant force between the rotor and the stator in order to enable a force-coupling that is as tilt-free as possible during operation.

According to an embodiment, the force control mechanism may be configured to control the spring component. In particular, the force control mechanism may be actuatable to selectively deactivate an action of the spring force between the rotor and the stator. Thus, the force control mechanism, which is preferably fully implemented in the base module, may be used to selectively deactivate the effect of the spring component that force-couples the stator and the rotor, for example to enable a replacement of the rotor in a force-free state.

According to an embodiment, the valve arrangement may have a coupling mechanism, which is provided partly on the stator and partly on the rotor or a valve housing (in which the rotor may be arranged) of the valve module for coupling the stator to the rotor. In particular, the coupling mechanism may be embodied in the form of a bayonet mechanism, a screw mechanism or a mechanism using at least one fastening element (in particular screws). Corresponding mechanically, magnetically or otherwise interacting structures on the rotor and/or valve housing on the one hand and the stator on the other hand may thus make it possible to selectively connect or disconnect the rotor and the stator to/from each other.

According to an embodiment, the coupling mechanism may be configured to permit decoupling of the stator and the rotor only if the rotor is force-released from the stator by the force control mechanism, such that the decoupling is otherwise made impossible. Advantageously, the mechanical configuration of the valve arrangement may therefore be configured in such a way that a removing of the stator from the rotor is only possible, if the stator and the rotor have been previously force-released by the force control mechanism.

In this way, undesirable force peaks may be prevented if the stator and the rotor were separated from each other in the force-coupled state. For example, in order to replace a rotor in the valve arrangement, a user must therefore first force-release the rotor and the stator by the force control mechanism, and may only subsequently remove the stator from the rotor in order to replace the latter. This enables an error-robust and simple, intuitive and, as it were, controlled handling of the valve arrangement for the replacement or maintenance of components in the interior of it.

According to an embodiment, the valve arrangement may have a drive device, in particular a motor, and further in particular an electric motor. The drive device may be configured to drive the rotor in a rotary manner. Such a drive device may be provided in order to rotate the rotor in the switching operation of the valve arrangement.

According to an embodiment, the drive device may be arranged at and/or in the base module. It is advantageous to place the drive device in the base module or to attach it to the former, since the drive device may then be configured only once for plural different valve modules. This further promotes a resource-saving configuration of the valve arrangement.

According to an embodiment, the force control mechanism may be configured to displace the rotor and the stator against each other (in particular axially) for force-releasing. For example, for force-releasing, the force control mechanism may move the rotor back in the axial direction (i.e. towards the base module) and thus place it at a distance from the stator. In particular, by the force-releasing, a direct physical contact between the opposing coupling surfaces of the rotor and the stator, which interact and touch each other during operation, may be eliminated. Such an operating logic may be implemented mechanically in a simple manner by the force control mechanism exerting a force on the rotor in the direction of the base module, and thereby deactivating a force pressing the rotor against the stator.

According to an embodiment, the force control mechanism may be activatable (or operatable) by muscle power, in particular, it may have an operating lever for activation by a user. It is therefore possible to implement a mechanical mechanism in the valve arrangement, which may be intuitively activated by a user, by which the user may apply the force and transmit it to the valve arrangement in order to achieve the force-releasing or the force-coupling between the rotor and the stator. This may be advantageously achieved by an actuation lever, which only needs to be tilted back by a user in order to switch back and forth between the force-coupling and force-released states.

According to an embodiment, the force control mechanism may be activatable in a controlled manner by a motor as an alternative or in addition to a muscle operation. As an alternative or in addition to the implementation of the force control mechanism for actuation by muscle power, the force control mechanism can thus also be actuated by motor control and/or automatically. According to a corresponding implementation, a separate drive mechanism (i.e. a drive mechanism, which may be different from another drive mechanism for rotating the rotor relative to the stator) may be implemented for actuating the force control mechanism. This may provide a valve arrangement that is particularly convenient for a user. This allows a valve arrangement that is particularly convenient for a user. According to another implementation, the same drive mechanism, which may be provided to rotate the rotor, may, in another operating mode, also be used for activating the force control mechanism. This enables a particularly compact valve arrangement.

According to an embodiment, the stator may have a plurality of fluid ports for connecting to a respective fluid line and optionally one or more fluid coupling channels. Such fluid connections or ports allow to fluidically connect one or more other fluidic components to the valve arrangement. Optionally, the stator may also have one or more fluid coupling channels, for example grooves in a contact surface to the rotor. By the latter measure, the function of the stator may be further refined.

According to an embodiment, the rotor may have at least one fluid coupling channel for selective fluidic coupling or fluidic decoupling of fluid ports (or fluid connections) of the stator. One or more fluid coupling channels, for example grooves in a coupling surface of the rotor to the stator, may form different fluid coupling states in different switching states of the valve arrangement. Fluid ports of the stator may be either fluidically coupled with or fluidically decoupled from each other by such fluid coupling channels. In this way, even complex fluidic tasks can be fulfilled.

According to an embodiment, the rotor and/or the stator may be a ceramic component. With such hard ceramic components, the achievable tilting protection between rotor and stator is particularly advantageous in order to achieve a long service life. For a configuration of the rotor or the stator as a ceramic component, a particularly high level of robustness against unwanted tilting between rotor and stator is important. Otherwise, the hard ceramic surfaces of the rotor and the stator may rub against each other and thus contribute to rapid wear of components of the valve arrangement. In particular, by evenly exerting a coupling force between rotor and stator in the circumferential direction, promoted by a disk spring package and/or the axially acting force control mechanism, such an undesired tilting may be suppressed and a long service life of the valve arrangement may be achieved.

According to an embodiment, the force control mechanism may be configured for force-releasing the rotor with respect to the stator for exerting a pulling force (or tensile force) on the rotor. Such a pulling force may be mechanically easily implemented and reliably achieve a desired force-release between rotor and stator. The force control mechanism may be configured to allow the tensile force to act in an axial direction, i.e. parallel to an axis of rotation of the rotor during operation.

According to an embodiment, the force control mechanism may be configured for force-releasing the rotor from the stator without contact, in particular for force-releasing the rotor by forming a distance between coupling surfaces of the rotor and the stator in a range between 0.1 mm and 0.5 mm, in particular between 0.2 mm and 0.3 mm. During operation of the valve arrangement, i.e. when fluid is transported between the rotor and the stator, the rotor and stator should be pressed together with force at mutually opposing contact surfaces in order to prevent leakage. If the force control mechanism force-releases and/or decouples the rotor and the stator relative to each other, this may result with advantage in that a direct touch and/or a straight physical contact between the interacting contact surfaces of the rotor and the stator is omitted. For this purpose, a small but precisely maintainable distance between the rotor and the stator can be set (or adjusted).

According to an embodiment, the valve arrangement may have an anti-rotation device for preventing a rotation between the rotor and the stator, in particular in order to set (or adjust) a predetermined angular position between the rotor and the stator. By implementing an anti-rotation device in the valve arrangement, in particular between the base module and the valve module, a fixed angular position between the rotor and the stator can be ensured in the assembled state. In this way, a controller of the valve arrangement can be reliably informed of the relative initial position of the rotor and stator after an assembly. This in turn enables a precise and correct control of desired fluid coupling states and/or fluid coupling states between the rotor and the stator.

According to an embodiment, the valve arrangement may have a rotor shaft between the rotor and the force control mechanism. The rotor may be placed on the rotor shaft and force-coupled to it in order to transmit torque from the rotor shaft to the rotor. In the axial direction, the rotor shaft may bridge a distance between the rotor and the force control mechanism.

According to an embodiment, the force control mechanism may have an eccentric and a connecting rod that interacts with it. Furthermore, a collet chuck may be provided, which acts on the rotor via the rotor shaft, and which transmits a pulling force of a connecting rod triggered by the eccentric. A mechanism, which has the eccentric and the connecting rod, may therefore, by a simple drive device, for example an electric motor, enable a rotational movement of the eccentric, which then moves the connecting rod, which is force-coupled with it, in an axial direction (i.e. parallel to a direction of rotation or axis of rotation of the rotor). The connecting rod may then act on the collet chuck, which in turn may cause an axial displacement of the rotatable rotor shaft. The rotor (which may also be called a rotor component) may be mounted on the rotor shaft such that it may follow the movement of the latter.

According to an embodiment, the method may have, after the force-releasing, a removing of the stator from the valve module for exposing the rotor, and subsequently a replacing of the rotor by a replacement rotor. The stator may thus form a part of the outer boundary of the valve arrangement. After the removing of the stator, the rotor may be exposed and may be easily replaced or serviced by a user.

According to an embodiment, the method may have, after the replacing, a coupling of the valve module equipped with the replacement rotor to the stator, and subsequently a force-coupling of the replacement rotor to the stator by (for example, actuating or controlling) the force control mechanism. In an inverse operation for removing a worn or to-be-serviced rotor, first the stator may be put back in place after the insertion of this replacement rotor, before the force-coupling is subsequently restored.

According to an embodiment, the valve arrangement may be configured or used for introducing the fluid sample into the mobile phase. The valve arrangement may thus be configured as an injector valve of an injector for injecting the fluidic sample into a mobile phase in a separation path between a fluid drive and a sample separation device of a sample separation apparatus.

According to an alternative or supplementary embodiment, the valve arrangement can be configured for admitting in a controlled manner the mobile phase that is to be driven by the fluid drive. The fluid drive may, for example, have plural piston pump units, which may be configured to pump the mobile phase. When coordinating the operation of the plural pistons of the piston pump units for conveying a mobile phase, for example to provide at a constant flow rate, one or more valve arrangements may be employed in a sample separation apparatus.

According to an embodiment, the separation device may be configured as a chromatographic separation device, in particular as a chromatography separation column. In the case of a chromatographic separation, the chromatography separation column may be provided with an adsorption medium. The fluidic sample may be retained on this medium, and may only subsequently be dissolved again in fractions with a sufficient amount of eluent (isocratic) or in the presence of a specific solvent composition (gradient), thus effecting the separation of the sample into its fractions.

The sample separation apparatus may be a microfluidic measuring device, a life science device, a liquid chromatography apparatus, an HPLC (high performance liquid chromatography) device, a UHPLC (ultra high performance liquid chromatography) system, an SFC (supercritical liquid chromatography) device, a gas chromatography device, an electrochromatography device and/or a gel electrophoresis device. However, many other applications are possible.

The fluid pump and/or the fluid drive may be arranged, for example, to move the mobile phase through the system at a high pressure, for example from a few 100 bar up to 2000 bar and more.

The sample separation apparatus may have a sample injector for introducing the sample into the fluid separation path. Such a sample injector may have an injection needle in a corresponding fluid path, which needle may be coupled to a seat, wherein the needle may be withdrawn from that seat in order to receive sample, whereby after reinsertion of the needle into the seat, the sample is in a fluid path, which may be switched into the system's separation path, for example by switching the valve arrangement, which results in the introduction of the sample into the fluid separation path.

The sample separation apparatus may have a fraction collector for collecting the separated components. Such a fraction collector may guide the different components for example into different liquid containers. However, the analyzed sample may also be fed to a drain container.

Preferably, the sample separation apparatus may have a detector for detecting the separated components. Such a detector may generate a signal, which may be observed and/or recorded, and which is indicative for the presence and quantity of the sample components in the fluid flowing through the system.

BRIEF DESCRIPTION OF THE FIGURES

Other objectives and many of the accompanying advantages of embodiments of the present invention will become readily appreciable and better understood by reference to the following more detailed description of embodiments in connection with the attached drawings. Features, which are substantially or functionally identical or similar, will be provided with the same reference numerals.

Figure 1:
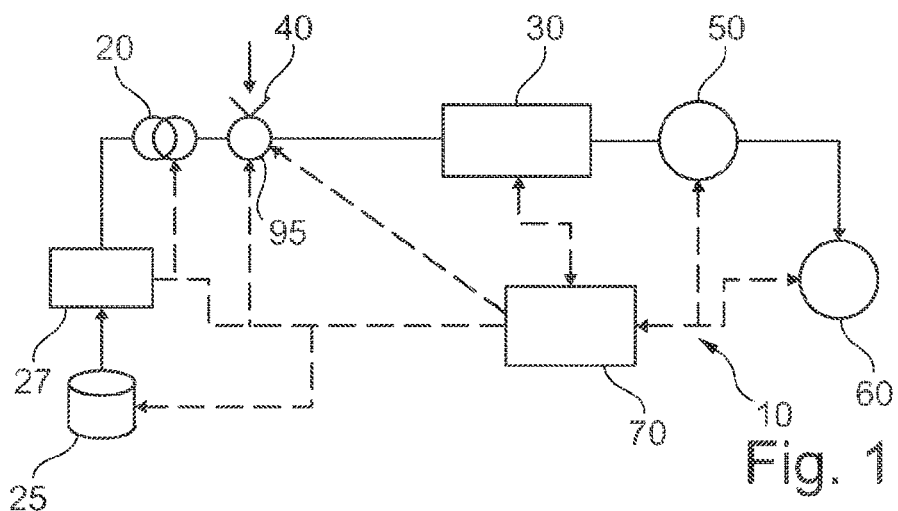
FIG. 1 shows an HPLC system according to exemplary embodiment of the invention.

The representation in the drawings is schematic.

DETAILED DESCRIPTION

Before exemplary embodiments are described with reference to the figures, some basic considerations shall be summarized, based on which exemplary embodiments of the invention have been derived.

In particular in ceramic valves, where two hard surfaces of a rotor and a stator rub against each other, it is important to apply a defined and homogeneous contact pressure to the rotor in an assembly of a valve arrangement. In a replacement of a rotor, it is often difficult for a user to avoid a tilting of the rotor relative to the stator. If the rotor is mounted on the stator inclined (or oblique) or askew, this leads to a high mechanical stress and therefore to a short service life of the rotor and the stator.

According to an embodiment of the invention, this problem can be counteracted by establishing a valve arrangement consisting of two separately provided modules. A base module is provided with at least a part of a force control mechanism for selectively force-releasing or force-coupling of a rotor and a stator. A valve module contains the stator and the rotor. The valve module and the base module can be separated from or connected to each other. Hardware components, which are independent of a specific fluidic valve function, can be integrated in the base module. Valve-specific components, however, can be implemented in one or more valve modules. Different valve modules can be operated with one and the same base module. In a mounted state of the valve module and the base module, the force control mechanism may be used to activate a force-coupling between the stator and the rotor for a fluidic operation, or to deactivate it for a maintenance or replacement operation. The rotor and the stator can be combined in a common valve housing to form the valve module. The valve housing including the rotor and a separate stator can be selectively connected to or disconnected from each other by a bayonet mechanism or other coupling mechanism. The actual force-coupling is effected after the connection of the rotor and the stator by actuating or controlling the force control mechanism. Therefore, for example for a replacement of the rotor, the rotor-stator system is first set force-free and contact-free. For this purpose, the force control mechanism is actuated or controlled accordingly. Once this force-release has been achieved, the stator may be removed from the valve housing with the rotor, and thereby the rotor may be exposed. Now, the rotor can be replaced or serviced. For a reassembly, after inserting a replacement rotor or after inserting the serviced original rotor, the stator is first put back on, and then the force-coupling between the stator and the rotor is reactivated again by actuating or controlling the force control mechanism. Now, the valve arrangement is completely assembled for fulfilling a fluidic valve task and may then be put back in operation.

Therefore, advantageously, a first mechanism for selectively force-releasing or force-coupling of the rotor and the stator may be provided in the valve arrangement. Furthermore, a second mechanism for separating and/or connecting the rotor and the stator can be implemented. Advantageously, the mechanism for separating and/or connecting the rotor and the stator may only be operated, if the first mechanism has set the rotor and the stator force-free. For the example of a bayonet connection between rotor and stator and a configuration of the force control mechanism, in which the latter actuates a disk spring assembly in the valve module, an actuation (or activation) force of the bayonet connection of, for example, 1 t would be required before the rotor and stator are force-released. As this is not applicable by a user with normal muscle power and/or by a drive device (e.g. an electric motor) that is provided as an alternative or supplement, a disassembly of the valve arrangement is only enabled in an error-robust sequence, i.e. after a force-release of the rotor-stator system.

For example, for replacing a rotor, the spring assembly described can be relieved of load by an actuation lever and then a force-free removal of the stator may be effected. Instead of such a lever, a threaded mechanism or a hydraulic mechanism is also possible. Another mimic may also be implemented for this purpose. Furthermore, a motor may also be used instead of or in addition to a lever mechanism. Demonstratively, a force control mechanism of a valve arrangement according to an exemplary embodiment of the invention can be used for decompressing a rotor seal with respect to a stator (in particular a stator that can be operated without screws). According to one embodiment, screwless operation is therefore also possible. For this purpose, for example, the aforementioned actuation lever and a bayonet mechanism can be used. The force-releasing of a rotor in relation to a stator can in particular release a rotor sealing force and a load force. This enables an easy replacement and low-wear operation of the valve arrangement, and thus increases its entire service life.

Advantageously, the rotor shaft can be moved in a motor-driven manner in order to effect a fluidic switching operation. For this purpose, a drive device, such as an electric motor, may be provided in the valve arrangement (in particular in the base module). It may also be advantageous to implement a second drive device in the valve arrangement for forming and/or actuating the force control mechanism. In this way, a separate motor may be provided in order to effect the force-release between the rotor and the stator and/or to effect the restoration of such a force-coupling.

FIG. 1 shows the basic structure of an HPLC system as an example of a sample separation apparatus 10, such as can be used for liquid chromatography. A fluid pump and/or a fluid drive 20 as a fluid drive device, which is supplied with solvents from a supply unit 25, drives a mobile phase through a sample separation device 30 (such as for example a chromatographic column), which contains a stationary phase. A degasser 27 may degas the solvents before they are fed to the fluid drive 20. A sample introduction unit 40 (also referred to as an injector) having a switching valve as a valve arrangement 95 is arranged between the fluid drive 20 and the sample separation device 30 in order to introduce a sample liquid into the fluidic separation path. The stationary phase of the sample separation device 30 is provided to separate components of the sample. A detector 50, which may have a flow cell and an optical arrangement, detects separated components of the sample. A fractionating device 60 may be provided to discharge separated components of the sample into containers provided for this purpose. Liquids that are no longer required may be discharged into a discharge container.

A control unit 70 controls the individual components 20, 25, 27, 30, 40, 50, 60, 95 of the sample separating apparatus 10.

Figure 2:
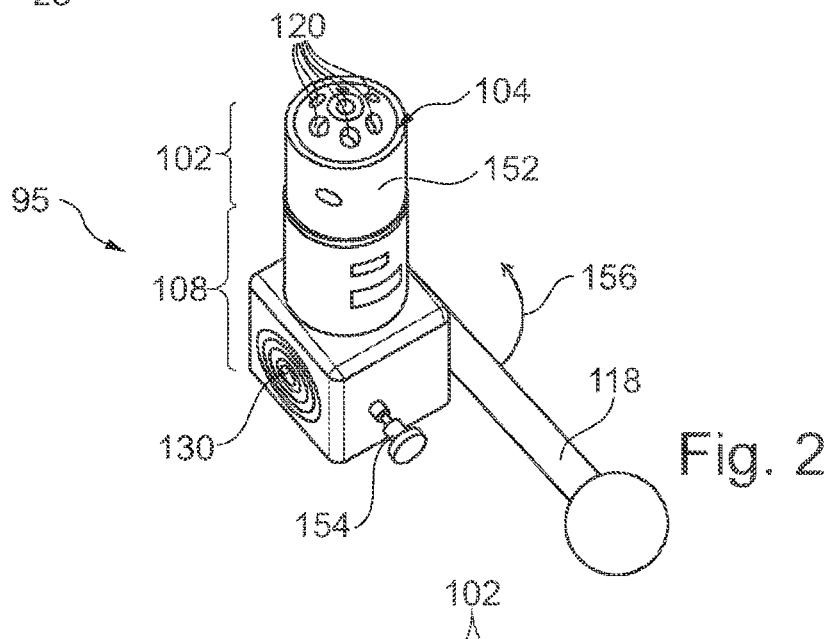
FIG. 2 shows a spatial view of a valve arrangement according to an exemplary embodiment of the invention.
Figure 3:
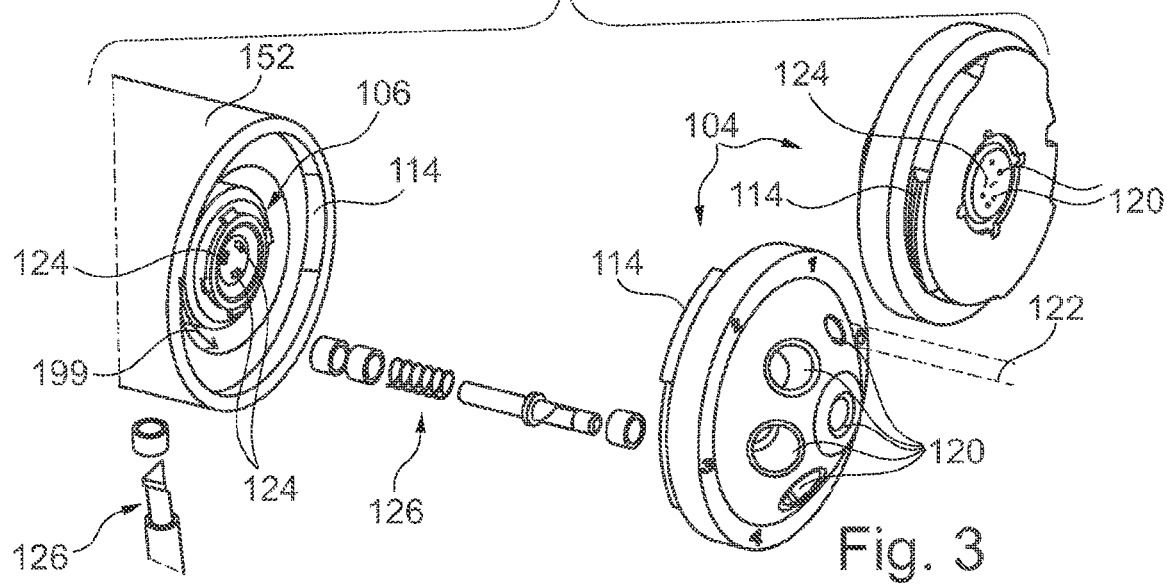
FIG. 3 shows an exploded view of a part of the valve arrangement according to FIG. 2.
Figure 4:
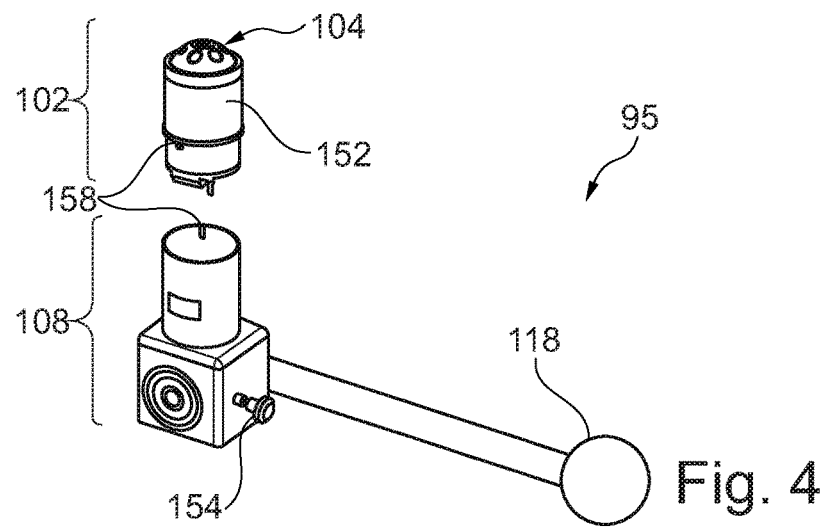
FIG. 4 shows a disassembled state of the valve arrangement according to FIG. 2.
Figure 5:
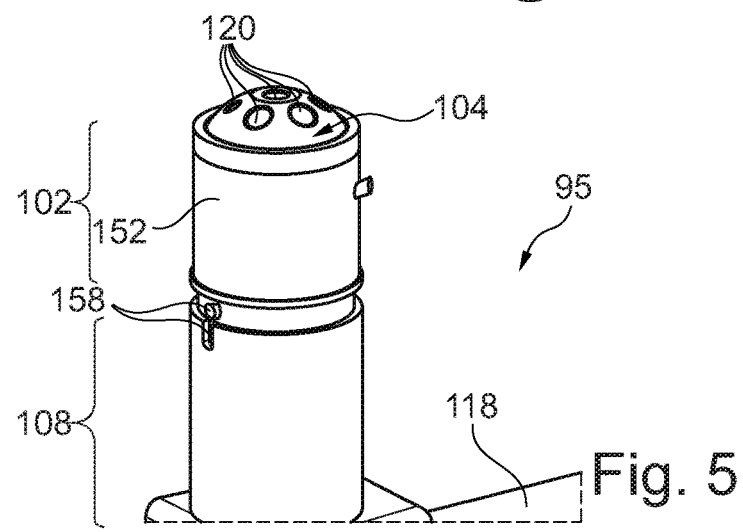
FIG. 5 shows a state of the valve arrangement according to FIG. 2 during an assembly of the valve module and the base module.
Figure 6:
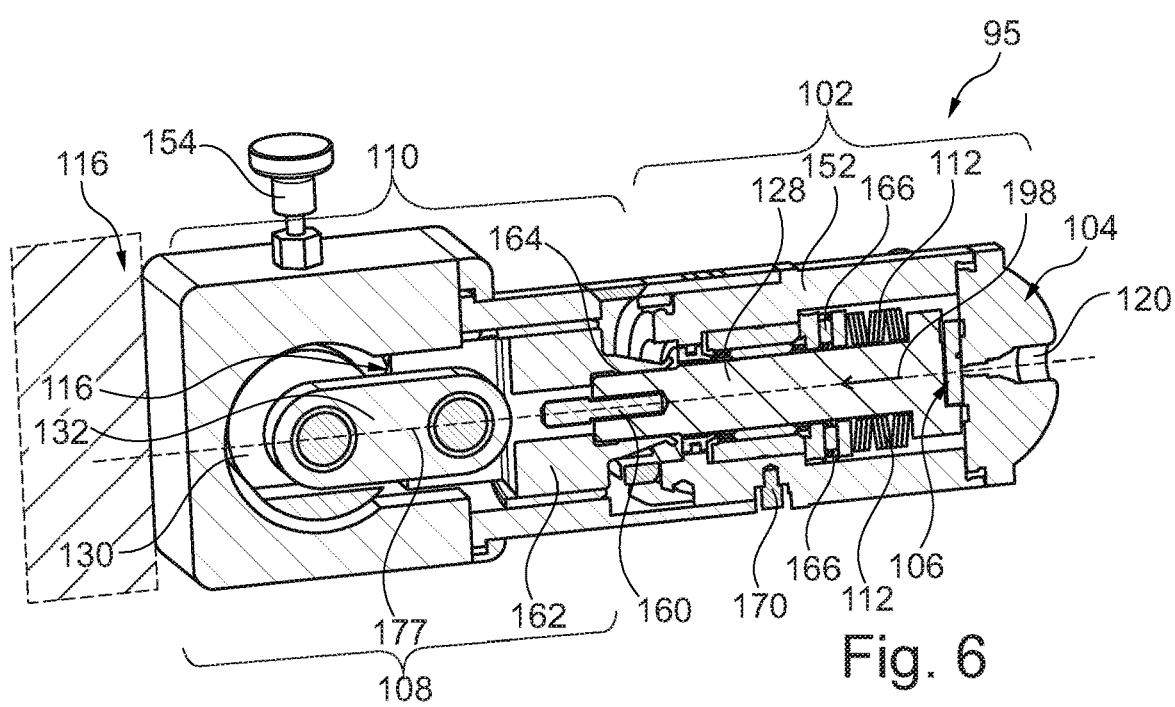
FIG. 6 shows a cross-sectional view of the valve arrangement according to FIG. 2.
Figure 7:
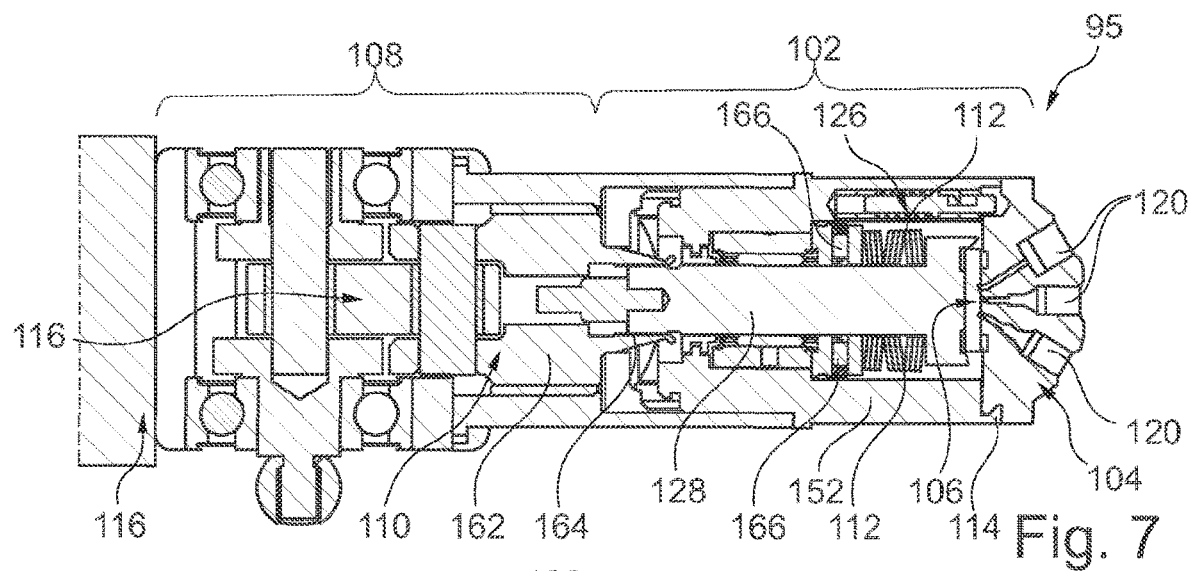
FIG. 7 shows another cross-sectional view of the valve arrangement according to FIG. 2.
Figure 8:
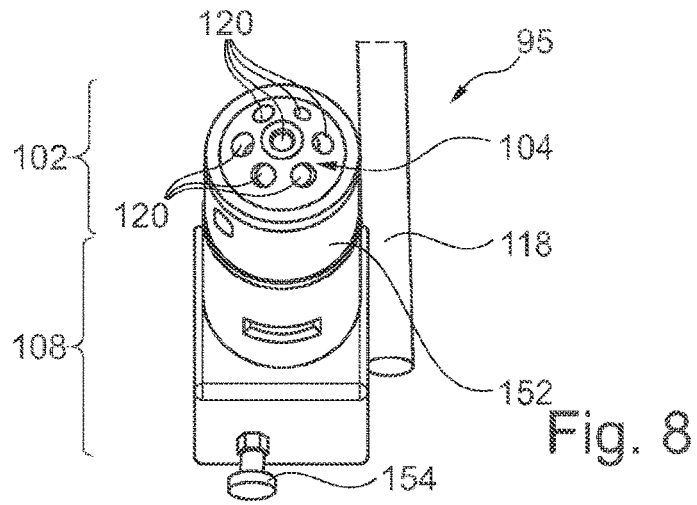
FIG. 8 shows a spatial top view of the valve arrangement according to FIG. 2.
Figure 9:
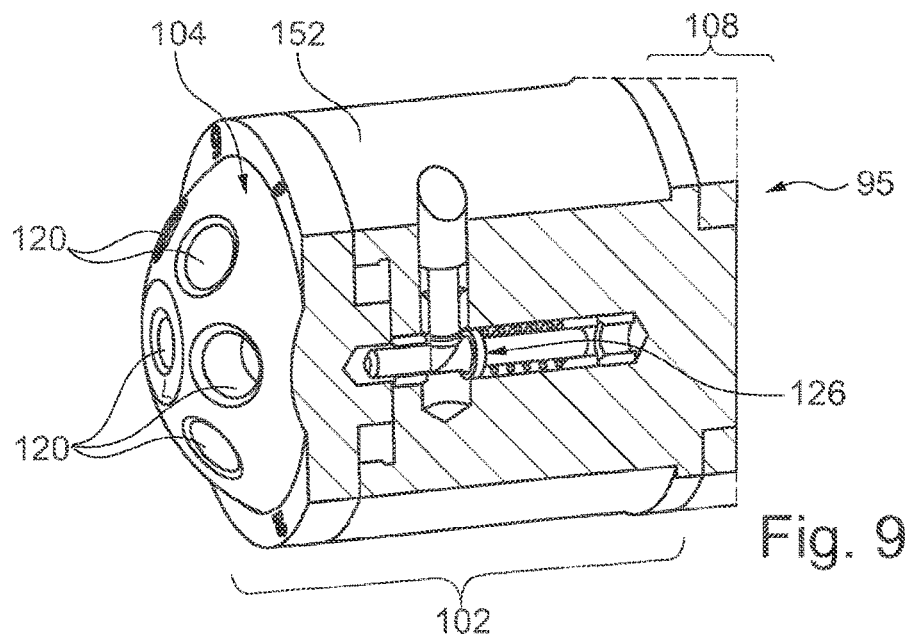
FIG. 9 shows a detail of the valve arrangement according to FIG. 2 with a partial cross-section.
Figure 10:
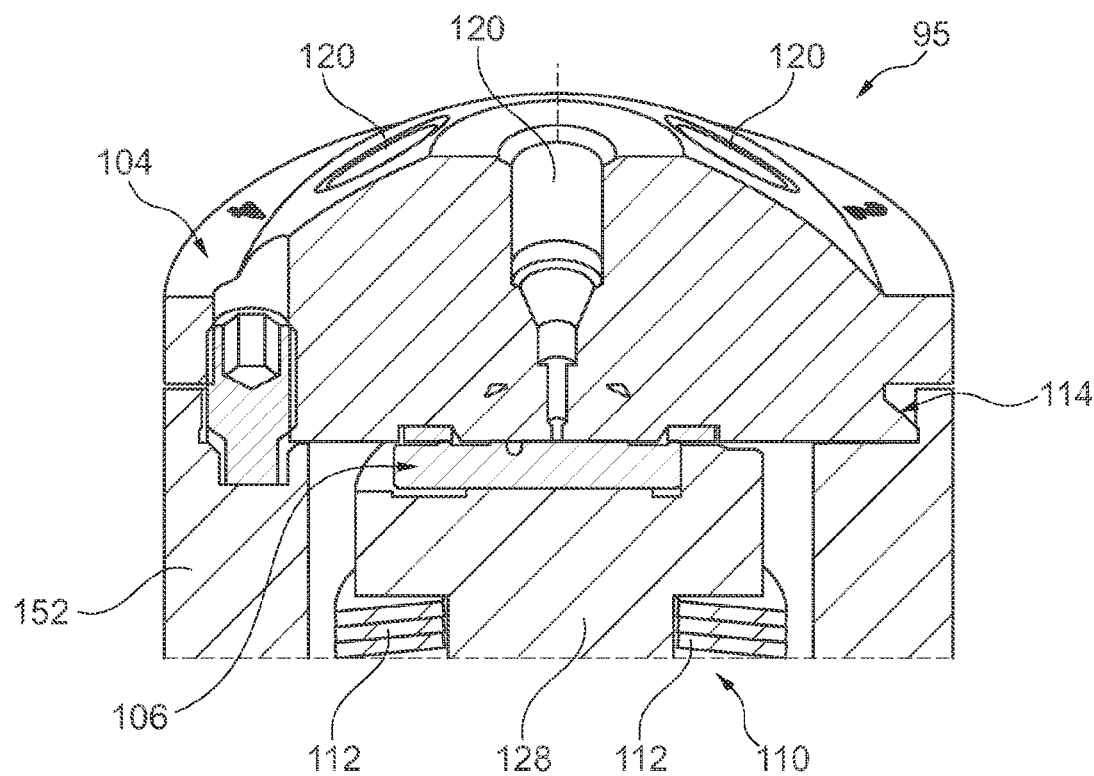
FIG. 10 shows a detail of the rotor and the stator of the valve arrangement according to FIG. 2 in a cross-sectional view.

The further figures show embodiments of the fluid valve and/or of the valve arrangement 95 according to exemplary embodiments of the invention:

FIG. 2 shows a spatial view of the valve arrangement 95 according to an exemplary embodiment of the invention. FIG. 3 shows an exploded view of a part of the valve arrangement 95 according to FIG. 2. FIG. 4 shows a disassembled state of modules (more precisely valve module 102 and base module 108) of the valve arrangement 95 according to FIG. 2. FIG. 5 shows a state of the valve arrangement 95 according to FIG. 2 during an assembly of valve module 102 and base module 108. FIG. 6 shows a cross-sectional view of the valve arrangement 95 according to FIG. 2. FIG. 7 shows another cross-sectional view of the valve arrangement 95 according to FIG. 2. FIG. 8 shows a spatial top view of the valve arrangement 95 according to FIG. 2. FIG. 9 shows a detail of the valve arrangement 95 according to FIG. 2 with a partial cross-section. FIG. 10 shows a detail of the rotor 106 and stator 104 of valve arrangement 95 according to FIG. 2 in a cross-sectional view.

As can best be seen in FIG. 4, the valve arrangement 95, which is configured as a high-pressure fluid valve, has the valve module 102 and the base module 108. The valve arrangement 95 can be operated, for example, with a fluid pressure in the range between 1200 bar and 2000 bar. The valve module 102 includes a stator 104 and a rotor 106, as described further below. The valve module 102 and the base module 108 are selectively coupleable to each other (see FIG. 2) or decoupleable from each other (see FIG. 4 and FIG. 5). Although this is not shown in the figure, the valve module 102 shown in FIG. 4 may be replaced by another valve module 102 of similar type (which may also be referred to as a replacement valve module). The other valve module 102 may also be coupled to the same base module 108. The different valve modules 102, 102 may differ, for example, with regard to fluid coupling patterns on the cooperating effective surfaces, an operating pressure supported by a respective seal, and an application assigned as a result of a special material configuration. The "other" valve module 102 may also be referred to herein as a further valve module 102, which includes a further stator 104 and a further rotor 106. It will be understood that in FIGS. 2-11, the valve module 102 (and associated stator 104 and rotor 106) illustrated may represent the original valve module 102 (and associated stator 104 and rotor 106) or, alternatively, the other (or further) valve module 102 (and associated further stator 104 and further rotor 106) that has replaced the original valve module 102 in accordance with the present disclosure.

The valve module 102 has a stator 104 and a rotor 106, as shown best in FIG. 3. The rotor 106 and the stator 104 may each be configured as a particularly hard ceramic component. FIG. 3 shows a bayonet mechanism, which is partly provided on the stator 104 and partly in a valve housing 152 of the valve module 102 (in which the rotor 106 is located), as a coupling mechanism 114 for selective rotary coupling of the stator 104 with the rotor 106. The rotor 106 is rotatable relative to the stationary stator 104, see the rotation arrow 199. By switching the valve arrangement 95 by changing the relative position between the stator 104 and the rotor 106, different fluid connection states are formable between the stator 104 and the rotor 106. On the basis of FIG. 3, it can be seen that the stator 104 has a plurality of fluid connections 120 for connection to a respective fluid line 122 (which is represented schematically). Correspondingly, the rotor 106 has fluid coupling channels 124 for selective fluidic coupling with, or fluidic decoupling from, the fluid connections 120 of the stator 104. In addition, also the stator 104 has optional fluid coupling channels 124. The valve module 102 thus has a simple design and substantially only fulfils the fluidic valve function described.

As can best be seen in FIG. 6 and FIG. 7, the base module 108 has a force control mechanism 110 for selectively force-releasing or force-coupling of the rotor 106 and the stator 104. When force-coupling the rotor 106 and the stator 104, their opposing effective surfaces (see the surfaces in FIG. 3 provided with reference numerals 120, 124, which are in physical connection in the fluid coupling operation) are pressed together in order to form a fluid-tight connection between them. During the operation of the valve arrangement 95 for providing a desired fluidic coupling, the force control mechanism 110 sets the force-coupled configuration. For force-releasing of the rotor 106 and the stator 104, their cooperating effective surfaces are separated from each other and/or converted into a contact-free configuration. In the force-released state, the valve arrangement 95 may be serviced, for example, or a component from the interior thereof may be replaced. More precisely, the force control mechanism 110 is configured, for force-releasing, to axially displace the rotor 106 and the stator 104 relative to each other. As can be seen in FIG. 2, the force control mechanism 110 is operable by muscle power by a user moving an actuation lever 118 for force-releasing from the configuration shown in FIG. 2 (force-coupling stator-rotor) to another configuration (force-decoupling or force-releasing stator-rotor) (see the rotation arrow 156). Alternatively or in addition, the force control mechanism 110 may be operable in a motor-controlled manner.

Stated more precisely, the force control mechanism 110 is configured for force-releasing the rotor 106 relative to the stator 104 in order to exert a pulling force (or tensile force) on the rotor 106. The direction of this pulling force is represented in FIG. 6 by an arrow 198. The force control mechanism 110 causes a contact-free force-releasing of the rotor 106 with respect to the stator 104 by establishing a distance between the cooperating effective surfaces of the rotor 106 and stator 104. This distance during force-release is, for example, in the range between 0.1 mm and 0.5 mm. This small stroke ensures a fast transition between the force-coupled and the force-free states and a high degree of operational safety.

In FIG. 6 and FIG. 7, it can be clearly seen that the force control mechanism 110 may interact with a force generation mechanism in the form of a spring component 112 of the valve module 102 formed as of a disk spring package for force-coupling the rotor 106 and the stator 104 by a spring force. The spring component 112 thus serves as a force generation mechanism for generating the coupling force. The latter may act for force-coupling between the rotor 106 and the stator 104 or can be shielded from any action on the rotor 106 or the stator 104 for force-releasing. The valve arrangement 95 thus has a spring component 112 arranged in the valve module 102 for the circumferentially homogeneous force-coupling of the rotor 106 and the stator 104 by a spring force. Demonstratively, the spring component 112 presses the rotor 106 against the stator 104 at the cooperating effective surfaces. The force control mechanism 110 is actuatable to selectively activate or deactivate the impact of the spring force on the rotor 106.

Advantageously, the coupling mechanism 114 may be configured to permit a mechanical decoupling of stator 104 and rotor 106 (i.e. a removal of the stator 104 from the remaining valve module 102 in the form of the valve housing 152 with the rotor 106 located inside) only if the rotor 106 has been force-released with respect to stator 104 by the force control mechanism 110. An unwanted or unintentional disassembly of the valve arrangement 95 by a user with loss of the tilt-free position between stator 104 and rotor 106 can be prevented by the described force-controlled disassembly logic. Demonstratively, the high contact force (or contact pressure) between the stator 104 and the rotor 106 in the force-coupled state clearly brings about that a user cannot release the bayonet mechanism between the stator 104 and the valve housing 152 together with the rotor 106 without first having set the force-released state.

The valve arrangement 95 further has a drive device 116, which is here formed as an electric motor, and which is configured for rotatably driving the rotor 106 for switching the valve arrangement 95 between different fluid coupling states. A rotor shaft 128 is arranged in the axial direction between the rotor 106 and the force control mechanism 110, and may be rotated by means of the drive device 116. The drive device 116 may be implemented, for example, in the base module 108 or can be coupled to the base module 108 (represented schematically in FIG. 6 and FIG. 7).

FIG. 3 shows best an anti-rotation device 126 for preventing an incorrect angular position due to a rotation between the rotor 106 and the stator 104 in relation to a target orientation during assembly. The anti-rotation device 126 demonstratively forces the rotor 106 and the stator 104 to maintain a specified nominal angular position during assembly. Then a control of the valve arrangement 95 is possible in an error-robust (or fault tolerant) way, because the initial position of the rotor-stator system after assembly is defined by the anti-rotation device 126.

In a valve operation of the valve arrangement 95, the valve module 102 and the base module 108 are coupled together, and the rotor 106 and the stator 104 are force-coupled with each other (see FIG. 2).

In a maintenance or replacement operation, firstly, a force-release of the rotor 106 relative to the stator 104 may be effected from the valve operation by a user tilting back the actuation lever 118, thereby actuating the force control mechanism 110 of the base module 108. After the force-releasing, an unscrewing of the stator 104 from the valve module 102 may be effected in order to expose the rotor 106. Again subsequently, a replacement of the rotor 106 by a replacement rotor (not shown) may be performed. After the replacement, a coupling of the valve module 102 provided with the replaced rotor 106 to the stator 104 may be effected by closing the bayonet mechanism by turning it in the opposite direction. Again subsequently, a force-coupling of the replaced rotor 106 with the stator 104 may be performed by actuating the force control mechanism 110. The valve arrangement 95 may then be operated in the valve mode again.

FIG. 2 shows the valve arrangement 95 in an operating state, in which the valve module 102 and the base module 108 are mounted together. In the position of the actuation lever 118 shown in FIG. 2, a force-coupling is formed between the stator 104 and the rotor 106 provided in FIG. 2 inside the valve housing 152. In the operating state shown in FIG. 2, fluidic components (for example a high-pressure pump as the fluid drive 20, a chromatographic separation column as the sample separation device 30, a fractionator 60, a flow cell of a detector 50, etc.) may therefore be connected to the fluid connections 120 of the stator 104.

FIG. 2 also shows an optional safety device (or protection) 154 for the actuation lever 118. If the safety device 154 is transferred to a corresponding protection state, an actuation of the actuation lever 118 is blocked in order to prevent an unwanted misoperation.

If the operating lever 118 is tilted back in the manner indicated in FIG. 2 by the rotation arrow 156, a force-releasing of the rotor 106 with respect to the stator 104 can be effected.

In FIG. 3, the stator 104 is shown twice, namely from a front side and from a back side. In particular, the interacting structures of the coupling mechanism 114 on the rotor 106 and the stator 104 are also shown, here formed as a bayonet connection. The anti-rotation device 126 shown in the exploded view is implemented as a captive pin in the interior of the valve housing 152, and ensures a fixed predefined angular position between the rotor 106 and the stator 104. An alternative anti-rotation device 126 is also represented in FIG. 3 in the lower left-hand area. The anti-rotation device 126 causes a defined zero position between the rotor 106 and the stator 104, which can be made known to a control software of a control unit 70 for controlling the valve arrangement 95. In this way, an error-robust valve control can be made possible. Demonstratively, the anti-rotation device 126 ensures that the stator 104 is oriented correctly to the valve housing 152, so that also the rotor 106 and stator 104 are oriented correctly to each other.

In FIG. 4, it is shown how the valve module 102 is removed from the base module 108. Coupling structures 158 on the valve module 102 (a coupling nose in the embodiment shown) and on the base module 108 (a coupling groove in the embodiment shown) cooperate in order to couple the valve module 102 and the base module 108. Alternatively, a loosening of the coupling structures 158 enables a decoupling between the valve module 102 and the base module 108, as shown in FIG. 4 and FIG. 5. In particular, in this way, a valve module 102 for a specific fluidic application may be replaced by another valve module 102 for another fluidic application, wherein one and the same base module 108 can always be used.

FIG. 6 shows the internal structure of the valve arrangement 95. In the force-coupled state, the spring component 112 formed as a disc spring assembly presses the rotor shaft 128 in a homogeneous manner in the circumferential direction relative to a central axis 177, which in turn presses the rotor 106 mounted on its front side against the stator 104.

A coupling pin 160 having a non-rotationally symmetrical cross-section (not shown) ensures a torque transmission from the drive device 116 (in particular an electric motor) to the rotor shaft 128 in order to rotate the rotor 106 relative to the stator 104 for switching the valve arrangement 95.

FIG. 6 and FIG. 7 further show that the force control mechanism 110 has an eccentric 130 and a connecting rod 132 cooperating therewith. For force-releasing, the actuation lever 118 (or alternatively a separate drive device and/or the same drive device 116, which is also used for turning the rotor 106) actuates the eccentric 130 so that the latter exerts an axial force on the connecting rod 132. This pulling force pulls a collet chuck 162 to the left as shown in FIG. 6, i.e. away from the rotor 106. A force-coupling structure 164 (for example a thread) is formed between the rotor shaft 128 and the collet chuck 162, so that the collet chuck 162 can pull the rotor shaft 128 back axially. In this way, the rotor 106 mounted on the rotor shaft 128 is also retracted axially, and is thus set force-decoupled and/or force-free from the stator 104.

A roller bearing 166 behind the spring component 112 ensures a low-friction operation. A pin 170 in the valve housing 152 ensures a correct relative position between the valve housing 152 and the drive unit 116.

The valve arrangement 95 shown in the figures is implemented for a high-pressure operation, in particular in a range between 1200 bar and 2000 bar. The spring component 112, which is formed as a disc spring assembly, has the task of pressing the rotor 106 against the stator 104 and thus of forming a fluid-tight connection that can withstand the pressures mentioned.

Demonstratively, the valve module 102 is formed as an exchangeable cartridge. A single base module 108 can be combined with a plurality of different valve modules 102 in order to form a respective valve arrangement 95. The different valve modules 102 may differ, for example, with regard to hole pattern, pressure and/or application.

Figure 11:
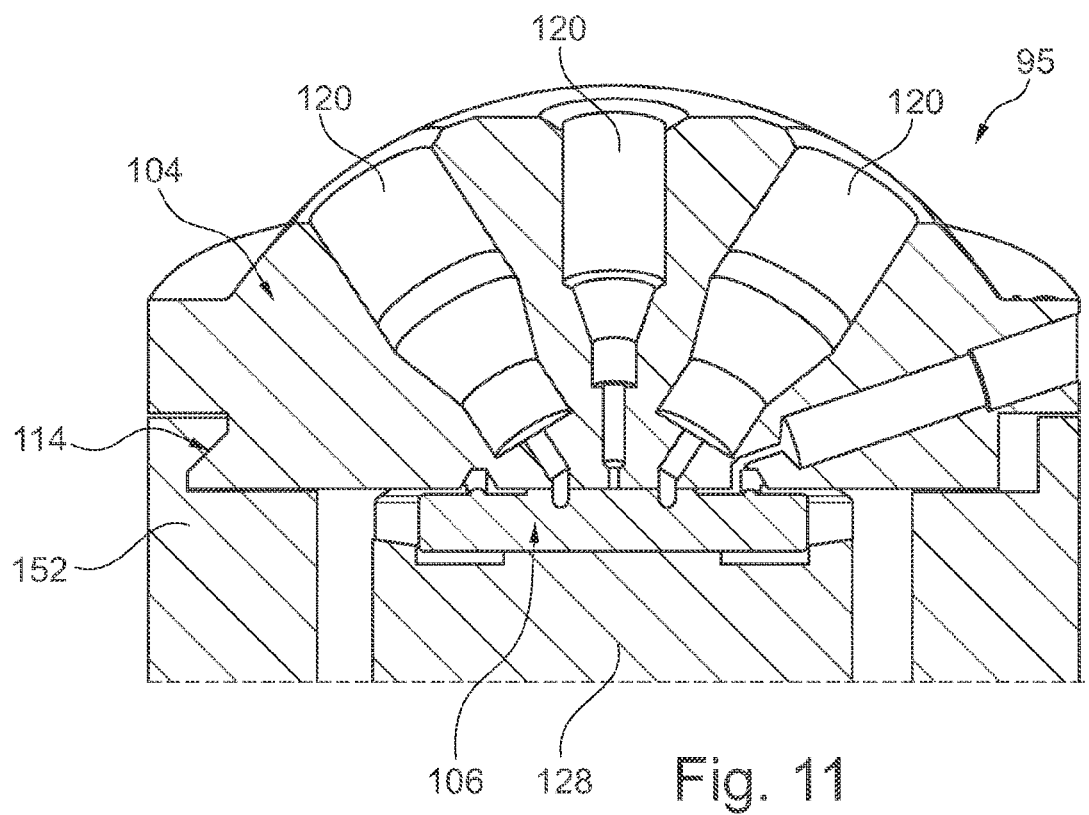
FIG. 11 shows a detail of the rotor and the stator of a valve arrangement in a cross-sectional view, according to an exemplary embodiment of the invention.

FIG. 11 shows a detail of the rotor 106 and the stator 104 of a valve arrangement 95 in a cross-sectional view according to an exemplary embodiment of the invention.

It should be noted that the term "comprising" or "comprises" does not exclude other elements, and that the term "a" or "an" does not exclude a plurality. Also, elements, which are described in connection with different embodiments, may be combined. It should also be noted that reference numerals in the claims should not be interpreted as limiting the scope of protection of the claims.

The invention claimed is:

1. A valve arrangement, comprising:
   a valve module comprising a stator and a rotor, wherein the rotor is rotatable relative to the stator such that at least one fluid connection is formable between the stator and the rotor;
   a force generation mechanism configured for force-coupling the rotor and the stator to each other;
   a force control mechanism configured to control the force generation mechanism to effect a selective activation or deactivation of the force-coupling between the rotor and the stator, wherein for deactivation, the force control mechanism is configured to bring the rotor and the stator out of contact with each other; and
   a base module comprising at least a part of the force control mechanism,
   wherein the valve module and the base module are selectively coupleable to each other or decoupleable from each other by the selective activation or deactivation of the force-coupling between the rotor and the stator.

2. The valve arrangement according to claim 1, comprising at least one further valve module comprising a further stator and a further rotor, wherein the further rotor is rotatable relative to the further stator, such that at least one fluid connection is formable between the further stator and the further rotor, and wherein the at least one further valve module is configured to be coupled to the base module instead of the valve module or to be decoupled from the base module.

3. The valve arrangement according to claim 2, wherein the valve module and the further valve module differ with respect to at least one of the group that consists of: a fluid coupling pattern; a supported operating pressure; and an associated application.

4. The valve arrangement according to claim 1, wherein the force generation mechanism is arranged in the valve module.

5. The valve arrangement according to claim 1, wherein the force generation mechanism comprises a spring component arranged in the valve module and configured for force-coupling the rotor and the stator by a spring force.

6. The valve arrangement according to claim 5, wherein the force control mechanism is configured to control the spring component and selectively deactivate an effect of the spring force between the rotor and the stator for force-releasing.

7. The valve arrangement according to claim 5, wherein for deactivation, the force control mechanism is configured to compress the spring component.

8. The valve arrangement according to claim 1, comprising a coupling mechanism configured to couple the stator to the rotor, wherein the coupling mechanism is provided partly at the stator and partly at the rotor or a valve housing of the valve module.

9. The valve arrangement according to claim 8, wherein the coupling mechanism is configured as a bayonet mechanism, a screw mechanism or a mechanism using at least one fastening element.

10. The valve arrangement according to claim 8, wherein the coupling mechanism is configured to permit a decoupling of the stator and the rotor only if the rotor is force-released relative to the stator by the force control mechanism.

11. The valve arrangement according to claim 1, comprising a drive device configured to rotatably drive the rotor, wherein the drive device is arranged at and/or in the base module.

12. The valve arrangement according to claim 1, comprising at least one of the following features:
   wherein the force control mechanism is actuatable by muscle power;
   wherein the force control mechanism comprises an actuation lever for actuating by a user;
   wherein the force control mechanism is actuatable by motor control;
   wherein the stator comprises a plurality of fluid ports, each of which is configured to connect to a respective fluid line;
   wherein the rotor comprises at least one switchable fluid coupling channel configured to selectively fluidically couple or fluidically decouple fluid ports and/or fluid coupling channels of the stator;
   wherein at least one of the rotor and the stator is a ceramic component;
   comprising an anti-rotation device configured to prevent an assembly-conditioned rotation between the rotor and the stator to thereby set a predetermined angular position between the rotor and the stator;
   comprising a rotor shaft between the rotor and the force control mechanism.

13. A sample separating apparatus for separating a fluidic sample, the sample separating apparatus comprising:
   the valve arrangement of claim 1;
   a fluid drive for driving a mobile phase and the fluidic sample present therein; and
   a sample separation device for separating the fluidic sample present in the mobile phase.

14. The sample separating apparatus according to claim 13, further comprising at least one of the following features:
   the valve arrangement is configured to introduce the fluidic sample into the mobile phase;
   the valve arrangement is configured to admit in a controlled manner the mobile phase to be driven by the fluid drive;
   the sample separation device is configured as a chromatographic separation device;
   the sample separation apparatus is configured for analyzing at least one physical, chemical and/or biological parameter of at least one fraction of the fluidic sample;
   the sample separation apparatus comprises at least one of the group consisting of: a device for chemical, biological and/or pharmaceutical analysis; a liquid chromatography device; and an HPLC device;
   the fluid drive is arranged to drive the mobile phase with a high pressure;
   the fluid drive is arranged to drive the mobile phase with a pressure of at least 800 bar;
   the sample separation apparatus is configured as a microfluidic device;
   the sample separating apparatus is configured as a nanofluidic device;
   the sample separating apparatus comprises a detector for detecting the separated fractions;
   the sample separation device comprises an injector for injecting the fluidic sample into the mobile phase, wherein the injector comprises the valve arrangement;
   the sample separation apparatus comprises a sample fractionator for fractionating the separated fractions.

15. A method for handling the valve arrangement of claim 1, the method comprising:
   operating the valve arrangement in an operating condition in which the valve module and the base module are coupled to each other, and the rotor and the stator are force-coupled to each other; and
   subsequently force-releasing the rotor relative to the stator by the force control mechanism.

16. The method according to claim 15, comprising, after the force-releasing:
   removing the stator from the valve module for exposing the rotor; and
   then replacing the rotor with a replacement rotor.

17. The method according to claim 16, comprising, after the replacing:
   coupling the valve module provided with the replacement rotor to the stator; and
   subsequently force-coupling the replacement rotor with the stator by the force control mechanism.

18. The valve arrangement according to claim 1, wherein for deactivation, the force control mechanism is configured according to at least one of:
   the force control mechanism is configured to axially displace the rotor and the stator relative to each other for force-releasing;
   the force control mechanism is configured to set the rotor axially back relative to the stator for force-releasing;
   the force control mechanism is, for force-releasing the rotor relative to the stator, configured to exert a pulling force on the rotor;
   the force control mechanism is configured for contactless force-releasing of the rotor relative to the stator by forming a distance between the rotor and the stator;
   the force control mechanism is configured for contactless force-releasing of the rotor relative to the stator by forming a distance between the rotor and the stator in a range between 0.1 mm and 0.5 mm;
   the force control mechanism is configured for contactless force-releasing of the rotor relative to the stator by forming a distance between the rotor and the stator in a range between 0.2 mm and 0.3 mm.

19. The valve arrangement according to claim 1, wherein the force control mechanism comprises an eccentric and a connecting rod, and the force control mechanism is configured to transmit a tensile force from the eccentric to the rotor via the connecting rod.

20. The valve arrangement according to claim 1, comprising a rotor shaft to which the rotor is mounted, and a collect chuck coupled to the rotor shaft, wherein the force control mechanism is configured to transmit a tensile force to the rotor and the rotor shaft via the collect chuck.

* * * * *